(12) United States Patent
Sun et al.

(10) Patent No.: US 8,199,437 B1
(45) Date of Patent: Jun. 12, 2012

(54) HEAD WITH AN AIR BEARING SURFACE HAVING A PARTICLE FENCE SEPARATED FROM A LEADING PAD BY A CONTINUOUS MOAT

(75) Inventors: Biao Sun, Fremont, CA (US); Eric T. Sladek, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 217 days.

(21) Appl. No.: 12/720,556

(22) Filed: Mar. 9, 2010

(51) Int. Cl.
G11B 21/21 (2006.01)
G11B 5/60 (2006.01)

(52) U.S. Cl. .................. 360/236; 360/235.6; 360/236.3

(58) Field of Classification Search ............... 360/235.6, 360/236, 236.3
See application file for complete search history.

(56) References Cited

U.S. PATENT DOCUMENTS

| | | | |
|---|---|---|---|
| 5,490,025 A | 2/1996 | Dorius et al. | |
| 5,940,249 A | 8/1999 | Hendriks | |
| 6,771,468 B1 | 8/2004 | Levi et al. | |
| 6,879,464 B2 | 4/2005 | Sun et al. | |
| 6,920,015 B2 | 7/2005 | Mundt et al. | |
| 6,937,439 B1 | 8/2005 | Chang et al. | |
| 6,980,399 B2 * | 12/2005 | Rajakumar et al. | 360/235.5 |
| 7,019,945 B1 | 3/2006 | Peng et al. | |
| 7,099,114 B2 | 8/2006 | Kang | |
| 7,230,797 B1 * | 6/2007 | Liu | 360/235.8 |
| 7,256,965 B2 * | 8/2007 | Rao et al. | 360/235.8 |
| 7,289,299 B1 | 10/2007 | Sun et al. | |
| 7,408,742 B2 | 8/2008 | Kameyama | |
| 7,477,486 B1 | 1/2009 | Sun et al. | |
| 7,525,763 B2 | 4/2009 | Yao et al. | |
| 2003/0058578 A1 * | 3/2003 | Boutaghou et al. | 360/236.3 |
| 2003/0165031 A1 * | 9/2003 | Rajakumar | 360/235.6 |
| 2004/0012887 A1 * | 1/2004 | Rajakumar et al. | 360/236.2 |
| 2004/0027724 A1 * | 2/2004 | Pendray et al. | 360/236.3 |
| 2004/0150916 A1 * | 8/2004 | Rao et al. | 360/235.8 |
| 2004/0156143 A1 * | 8/2004 | Kang | 360/235.8 |
| 2005/0105216 A1 * | 5/2005 | Ueno et al. | 360/236.3 |
| 2007/0103816 A1 * | 5/2007 | Nakakita et al. | 360/235.5 |
| 2007/0195461 A1 * | 8/2007 | Kajitani | 360/235.4 |
| 2011/0195275 A1 * | 8/2011 | Huha et al. | 428/815.1 |

* cited by examiner

Primary Examiner — Craig A. Renner

(57) ABSTRACT

A novel head includes an air bearing surface having a trailing pad adjacent the read transducer and lying in a primary plane. The air bearing surface includes a sub-ambient pressure cavity recessed from the primary plane by at least 500 nm. At least one leading pad is disposed upstream of the sub-ambient pressure cavity and has a leading pad surface in the primary plane. A moat is disposed upstream of the leading pad and is recessed from the primary plane by at least 500 nm. The moat continuously spans the entire width of the slider. A particle fence in the primary plane is disposed immediately upstream of the moat and adjacent the leading face. The particle fence continuously laterally spans at least 70% of the width of the slider.

10 Claims, 4 Drawing Sheets

HEAD WITH AN AIR BEARING SURFACE HAVING A PARTICLE FENCE SEPARATED FROM A LEADING PAD BY A CONTINUOUS MOAT

FIELD OF THE INVENTION

The present invention relates generally to the field of information storage devices, and more particularly to air bearing sliders used in such devices.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For convenience, all such heads may be referred to as read heads herein.

Referring now to FIG. 1, a contemporary hard disk drive 100 includes a disk drive base 102, at least one disk 104 (such as a magnetic disk, magneto-optical disk, or optical disk), a spindle motor 106 attached to the base 102 for rotating the disk 104, and a head stack assembly (HSA) 110. The spindle motor 106 typically includes a rotating hub on which disks are mounted and clamped, a magnet attached to the hub, and a stator. Various coils of the stator are selectively energized to form an electromagnetic field that pulls/pushes on the magnet, thereby rotating the hub. Rotation of the spindle motor hub results in rotation of the mounted disks. The HSA 110 typically includes at least one actuator arm 114, and at least one head gimbal assembly (HGA) 124 that includes a read head.

During operation of the disk drive, the HSA 110 rotates to position the read head along an arc adjacent desired information tracks on the disk 104. The HSA 110 includes a pivot bearing cartridge 118 to facilitate such rotational positioning. The HSA 110 typically includes a voice coil that interacts with one or more fixed magnets on a magnetic yoke 112, to rotate the HSA 110. For example, when the HSA 110 is rotated such that the HGA 124 leaves a ramp 120, the read head is loaded onto a surface of the disk 104. Other contemporary disk drive components shown in FIG. 1 include a flex cable bracket 116 and a recirculation air filter 108.

In magnetic hard disk drives, each read head typically comprises a body called a "slider" that carries a magnetic transducer on its trailing end. The magnetic transducer typically comprises a writer and a read element. The magnetic transducer's writer may be of a longitudinal or perpendicular design, and the read element of the magnetic transducer may be inductive or magnetoresistive (e.g. so-called "giant" magneto-resistive read element, tunneling magneto-resistive read element, etc). In a magnetic hard disk drive, the transducer is typically supported in very close proximity to the magnetic disk by a hydrodynamic air bearing. As the motor rotates the magnetic disk, the hydrodynamic air bearing is formed between an air bearing surface of the slider of the read head, and a surface of the magnetic disk. The thickness of the air bearing at the location of the transducer is commonly referred to as "flying height."

Magnetic hard disk drives are not the only type of information storage devices that have utilized air bearing sliders. For example, air bearing sliders have also been used in optical information storage devices to position a mirror and an objective lens for focusing laser light on the surface of disk media that is not necessarily magnetic.

The flying height is a key parameter that affects the performance of an information storage device. If the flying height is too high, the ability of the transducer to write and/or read information to/from the disk surface may be substantially degraded. Therefore, reductions in flying height can facilitate desirable increases in the areal density of data stored on a disk surface. However, it is not beneficial to eliminate the air bearing between the slider and the disk surface entirely, because the air bearing serves to reduce friction and wear (between the slider and the disk surface) to an acceptable level. Excessive reduction in the nominal flying height may degrade the tribological performance of the disk drive to the point where the lifetime and reliability of the disk drive become unacceptable.

Another factor that can adversely affect the tribological performance of the read head, and therefore also adversely affect the disk drive's lifetime and reliability, is the extent to which particulate debris can enter the air bearing during operation. Because the thickness of the air bearing is just a few tens of nanometers or less (typically minimum at the trailing edge of the slider because of the slider's positive pitch angle), even small debris particles can be large enough to interfere with the desired spacing between the air bearing surface and the disk surface. Such particulate debris that enter into the air bearing can undesirably cause abrupt thermal disturbances to the read element and/or temporarily change the flying characteristics of the slider, potentially causing immediate reading or writing errors. Such debris that enter into the air bearing can also drag along the disk surface and possibly damage the disk surface, potentially destroying data and/or leading to future tribological failure (e.g. head crash).

Air bearing features that discourage the entry of particulate debris have been proposed before. For example, U.S. Pat. No. 5,490,025 to Dorius et al. discloses a debris deflecting feature in an air bearing design. However, past air bearing design features that discourage the entry of particulate debris have been detrimental to the flying characteristics of the slider, for example reducing super-ambient pressure in key regions of the air bearing and thereby unacceptably reducing the load carrying capacity of the air bearing. Certain such design features can also adversely affect the ability of the air bearing to maintain an acceptable roll angle in the face of expected changes to the skew angle of the slider (relative to the direction of disk surface motion). Such skew angle changes are expected as the actuator positions the read head to different disk radii. The shortcomings of contemporary air bearing design features to discourage entry of particles may be exacerbated in sliders having a smaller air bearing area, such as newer smaller-form factor sliders (e.g. the so-called "femto" form factor).

Accordingly, what is needed in the art is an air bearing design that can discourage the entry of particulate debris while maintaining acceptable air bearing performance characteristics even in small form factor sliders.

SUMMARY

A novel head is disclosed and claimed. It includes a slider having a leading face, a trailing face that is opposite the leading face, and an air bearing surface that is normal to the trailing face. The air bearing surface defines an upstream direction pointing from the trailing face to the leading face, and a lateral axis that is orthogonal to the upstream direction. The slider has a width measured along the lateral axis. The head also includes a read transducer adjacent the trailing face.

The air bearing surface includes a trailing pad that has a major surface adjacent the read transducer. The major surface lies in a primary plane. The air bearing surface includes a sub-ambient pressure cavity disposed upstream of the trailing pad. The sub-ambient pressure cavity defines a cavity surface being recessed from the primary plane by at least 500 nm. The air bearing surface includes at least one leading pad disposed upstream of the sub-ambient pressure cavity and including a leading pad surface in the primary plane. A moat is disposed upstream of the leading pad. The moat has a moat surface recessed from the primary plane by at least 500 nm. The moat surface continuously spans the entire width of the slider. A particle fence is disposed immediately upstream of the moat and is disposed adjacent the leading face. The particle fence includes a fence surface in the primary plane that continuously laterally spans at least 70% of the width of the slider.

DETAILED DESCRIPTION OF EXEMPLARY EMBODIMENTS

Figure 1:
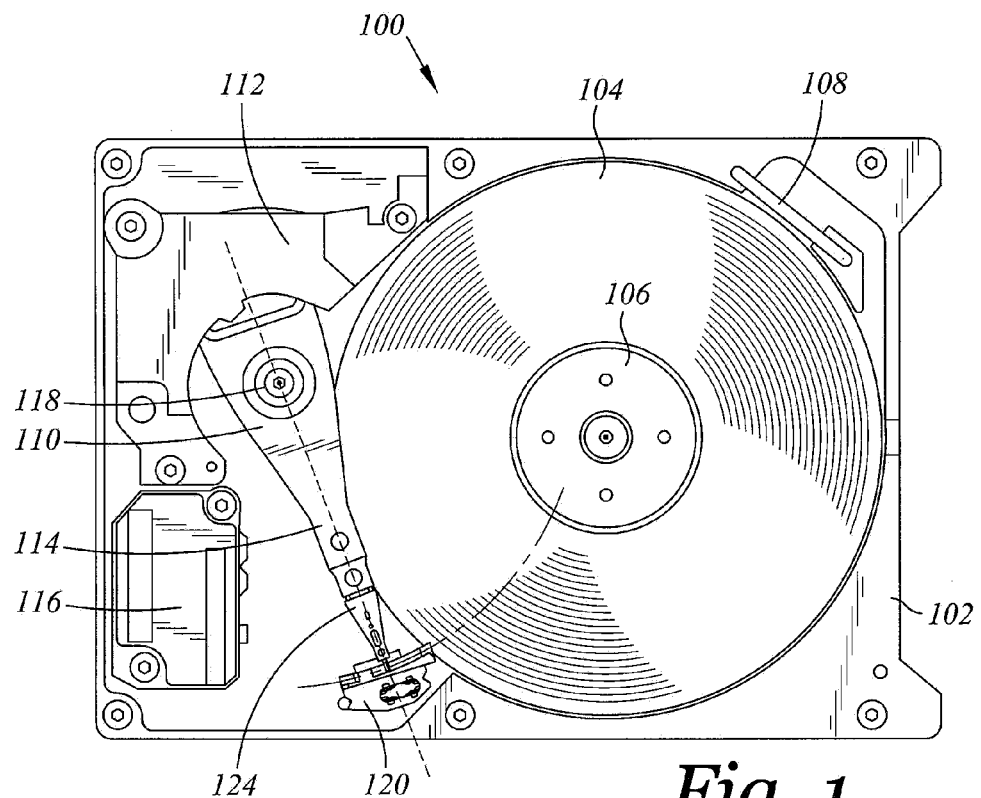
FIG. 1 depicts a contemporary hard disk drive information storage device.
Figure 2:
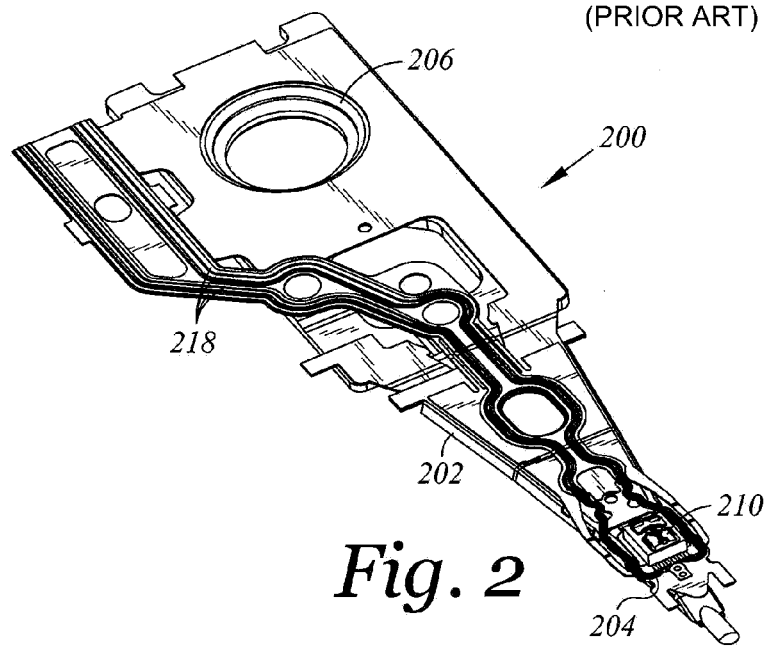
FIG. 2 is head gimbal assembly including a head in accordance with an embodiment of the present invention.

FIG. 2 is head gimbal assembly (HGA) 200 that includes a load beam 202, a laminated flexure 204, and a swage mount 206. The HGA 200 also includes a head 210 in accordance with an embodiment of the present invention, which is bonded to a tongue of the laminated flexure 204. The laminated flexure 204 provides structural support and compliance to the head 210, and also provides a plurality of electrically conductive traces 218, preferably including traces for carrying electrical signals from/to a read/write transducer of head 210.

Figure 3:
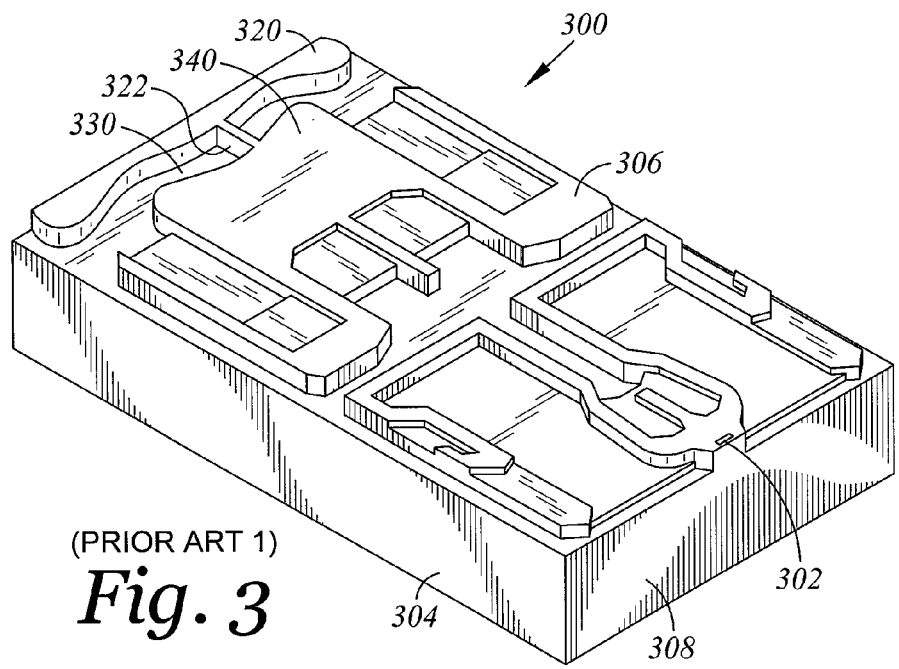
FIG. 3 depicts a head according to the prior art. Note that for clarity, the air bearing features are not to scale but rather are exaggerated so as to be easily discernible.

FIG. 3 depicts a head 300 according to the prior art. Now referring to FIG. 3, head 300 comprises a transducer 302 for reading and writing information from/to an adjacent disk surface. For example, the transducer 302 may be a merged thin film magnetic transducer comprising an inductive writer and magneto resistive read element. The magneto resistive element may be a giant magneto resistive element (GMR) or tunneling magneto resistive element (TMR). The writer may be a perpendicular magnetic recording (PMR) writer.

Head 300 also comprises a slider 304, which is typically fabricated from a ceramic material such as alumina titanium carbide. Slider 304 includes an air bearing surface 306, which may be formed on the surface of slider 304 by etching or ion milling and has a geometry that may be defined by use of a mask. Note that for clarity, the features of air bearing surface 306 are not to scale but rather are vertically exaggerated so as to be easily discernible. The slider 304 also includes a trailing face 308 adjacent the transducer 302.

The air bearing surface 306 includes a particle fence 320 and a moat 330 upstream of a leading pad 340, but the moat 330 does not continuously span the entire width of the slider 304. Rather, the moat 330 is discontinuous because it is interrupted by a particle fence connector 322, which connects the particle fence 330 to a leading pad 340. Such a moat discontinuity can be detrimental to air bearing performance as described later herein.

Figure 4:
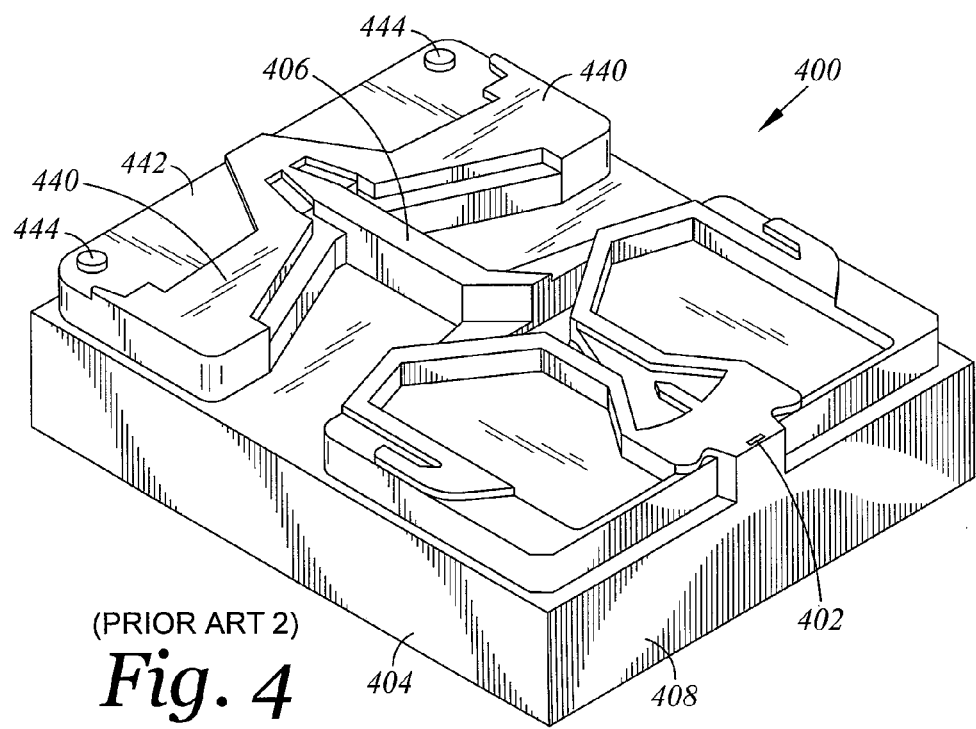
FIG. 4 depicts a head according to the prior art. Note that for clarity, the air bearing features are not to scale but rather are exaggerated so as to be easily discernible.

FIG. 4 depicts a head 400 according to the prior art. Now referring to FIG. 4, head 400 comprises a transducer 402 for reading and writing information from/to an adjacent disk surface. Head 400 also comprises a slider 404, which is typically fabricated from a ceramic material such as alumina titanium carbide. Slider 404 includes an air bearing surface 406, which may be formed on the surface of slider 404 by etching or ion milling and has a geometry that may be defined by use of a mask. Note that for clarity, the features of the air bearing surface 406 are not to scale but rather are vertically exaggerated so as to be easily discernible. The slider 404 also includes a trailing face 408 adjacent the transducer 402.

The air bearing surface 406 includes a leading pad 440, and a recessed leading step surface 442 upstream of the leading pad 440. However, the air bearing surface 406 does not have a particle fence upstream of a leading pad 440. Outboard dots 444 on the leading step surface 442 cannot function as a particle fence, at least because they do not span a sufficient extent of the width of the slider 404.

Figure 5:
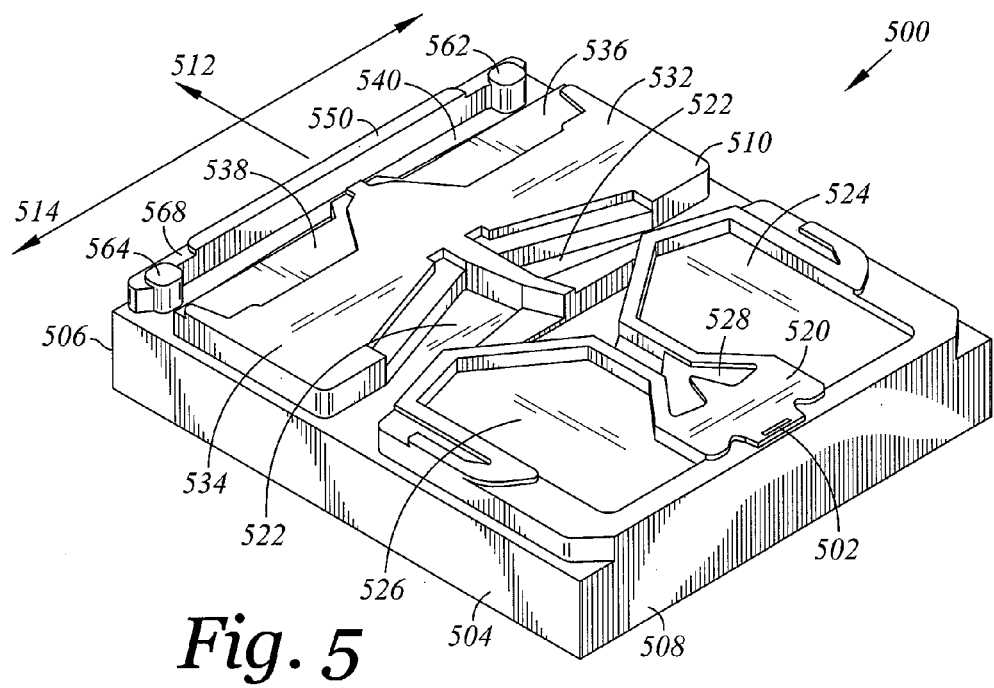
FIG. 5 is a perspective view of a head according to an embodiment of the present invention. Note that for clarity, the air bearing features are not to scale but rather are exaggerated so as to be easily discernible.
Figure 6:
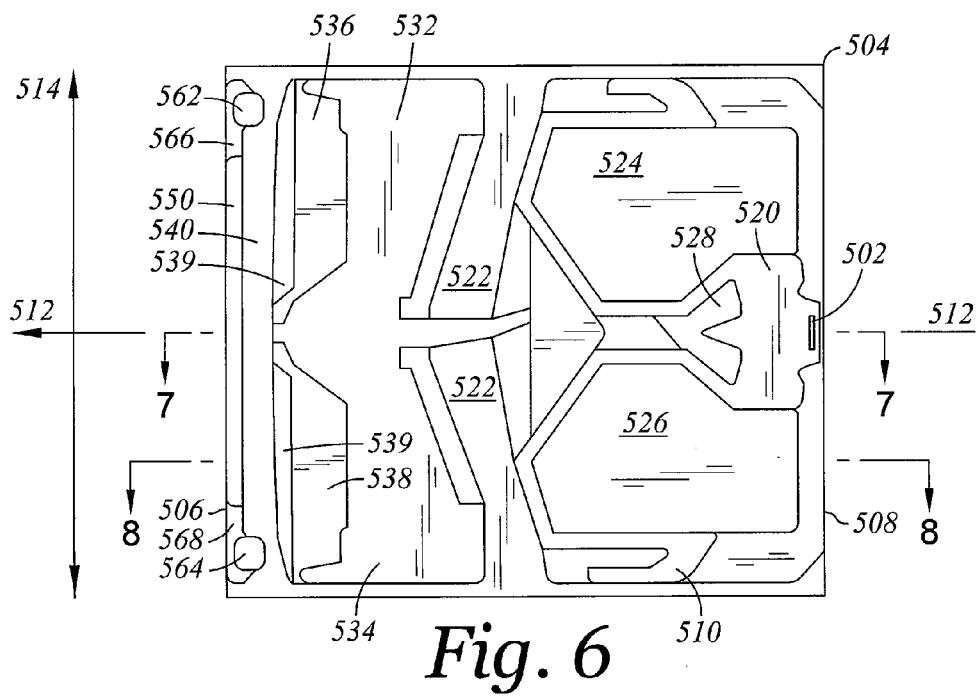
FIG. 6 is a plan view of a head according to an embodiment of the present invention.

FIG. 5 is a perspective view of a head 500 according to an embodiment of the present invention. FIG. 6 is a plan view of the head 500. Now referring to FIGS. 5 and 6, head 500 comprises a transducer 502 for at least reading information from an adjacent disk surface. Head 500 also comprises a slider 504, which is typically fabricated from a ceramic material such as alumina titanium carbide. The slider 504 has a leading face 506 and a trailing face 508 that is opposite the leading face. The slider also has an air bearing surface 510 that is normal to the trailing face 508. Note that other devices and transducers (e.g. a slider based microactuator, a heater for protrusion control, etc) may also be disposed on or adjacent the trailing face, in addition to the read transducer 502. For example, the read transducer 502 may be part of a merged transducer that also includes a write transducer.

The air bearing surface 510 defines an upstream direction (e.g. 512) pointing from the trailing face 508 to the leading face 506. The term "upstream" is used herein only to define a directional convention to facilitate description of relative positions on the air bearing surface 510, and does not require the presence or existence of any stream. For example, "upstream" can be understood to refer to a range of directions across the air bearing surface 510 that generally point away from the trailing face 508 and towards the leading face 506. As such, in disk drive applications, upstream directions would ultimately be generally opposite the motion of an adjacent rotating disk surface. An upstream direction would be a direction within the aforementioned range. The term "downstream" is used herein as an antonym of "upstream."

For each upstream direction, the air bearing surface 510 defines a lateral axis that is orthogonal to that upstream direction. For example, for a zero-skew upstream direction 512 that is parallel to the air bearing surface 510, the air bearing surface 510 defines a corresponding lateral axis 514 that is parallel to the leading face 506 or the trailing face 508 (i.e. orthogonal to that upstream direction). The width of the slider 504 can be measured along lateral axis 514. For example, so-called "femto" form factor sliders would then typically have a width of 0.70 mm and a length of 0.85 mm, while so-called "pico" form factor sliders would then typically have a width of 1.00 mm and a length of 1.25 mm. Of course, non-zero skew upstream directions are also contemplated herein. Note that for clarity, the features of air bearing surface 510 are not to scale in FIG. 5, but rather are vertically exaggerated (i.e. exaggerated in a direction normal to both the upstream direction 512 and the lateral axis 514) so as to be easily discernible.

In the embodiment of FIGS. 5 and 6, the air bearing surface 510 includes a trailing pad 520 including a major surface adjacent the read transducer 502, the major surface lying in a primary plane. The transducer 502 itself may comprise an overcoat material (e.g. alumina) that is incidentally slightly recessed from the primary plane, because alumina may etch away more rapidly than does alumina titanium carbide during fabrication of the air bearing. During operation, the trailing pad 520 can develop a super-ambient pressure region between the air bearing surface 510 and the surface of an adjacent disk that can help maintain a desired flying height at the location of transducer 502. For example, in the embodiment of FIGS. 5 and 6, the trailing pad 520 creates a region of high pressure, including the highest pressure generated by the air bearing surface during normal operation of the head.

In the embodiment of FIGS. 5 and 6, a pressurizing step surface 528 is disposed upstream of the trailing pad 520. The pressurizing step surface 528 preferably includes a surface that is recessed from the primary plane by 100 nm to 250 nm. During operation, the pressurizing step surface 528 can enhance the super-ambient pressure between the trailing pad 520 and the surface of an adjacent disk. Such enhanced pressurization may reduce the surface area required for the trailing pad 520.

In the embodiment of FIGS. 5 and 6, the air bearing surface 510 includes deep sub-ambient pressure cavities 522 and shallow sub-ambient pressure cavities 524, 526, all disposed upstream of the trailing pad 520. These sub-ambient pressure cavities are recessed from the primary plane by 500 nm or more. During operation, one or more of these sub-ambient pressure cavities can develop a sub-ambient pressure region between the air bearing surface 510 and the surface of an adjacent disk. The sub-ambient pressure may serve to reduce flying height sensitivities to changes in altitude and air bearing geometries.

In the embodiment of FIGS. 5 and 6, the air bearing surface 510 includes two leading pads 532, 534 in the primary plane and disposed upstream of the deep sub-ambient pressure cavities 522. The two leading pads 532, 534 together span at least 60% of the width of the slider 504. Preferably but not necessarily, the two leading pads 532, 534 may be shaped and adjoined together to form a shape like a letter W that is oriented so that the center peak of the W points in the upstream direction 512, as shown in FIGS. 5 and 6. During operation, the leading pads 532, 534 can develop a super-ambient pressure region between the air bearing surface 510 and the surface of an adjacent disk, causing the slider to assume a positive pitch attitude. In the embodiment of FIGS. 5 and 6, the leading pads 532, 534 also include leading pressurizing steps 536 and 538, respectively. The leading pressurizing steps 536 and 538 preferably include a surface that is recessed from the primary plane by 100 nm to 250 nm. During operation, the leading pressurizing steps 536, 538 can help develop super-ambient pressure between the leading pads 532, 534, respectively and the surface of an adjacent disk.

In the embodiment of FIGS. 5 and 6, the air bearing surface 510 includes a moat 540 disposed upstream of the leading pads 532, 534. The moat 540 is recessed from the primary plane by at least 500 nm. The moat 540 continuously spans the entire width of the slider 504. In certain embodiments it can be critical that the moat 540 continuously spans the entire width of the slider 504, because that can help facilitate control of the so-called "roll profile." The roll profile is the variation of slider roll angle, over a range of skew angles and velocities (relative to the motion of an adjacent disk) that correspond to variation in the position of the slider from the disk inner diameter to the disk outer diameter during operation of the disk drive. Typically, "flattening" of the roll profile (e.g. less variation of slider roll versus skew angle and/or velocity changes), is desirable. In the embodiment of FIGS. 5 and 6, the moat 540 preferably has an extent measured along the upstream direction 512 that is at least 25 microns and no more than 8% of the total slider length measured along the upstream direction 512. These dimensional limits may be critical in certain embodiments, for example to avoid undesirable fabrication process consequences (e.g. due to tolerance stack-up), and/or to allow air flow having a lateral component through the moat 540 (sufficiently to adequately pressurize the air bearing surface 510).

In the embodiment of FIGS. 5 and 6, the air bearing surface 510 includes a particle fence 550 in the primary plane and disposed immediately upstream of the moat 540. The particle fence 550 is disposed adjacent the leading face 506, and helps prevent particulate contamination from entering the air bearing. In this context, "adjacent" means only that there is no air bearing feature in the primary plane that is closer than the "adjacent" feature. The particle fence 550 continuously laterally spans at least 70% of the width of the slider 504. This minimum may be critical in certain embodiments, for example to ensure adequate particle rejection by the particle fence 550 over a practical range of skew angles, while allowing sufficient airflow around the particle fence to adequately pressurize the air bearing surface 510 over a practical range of skew angles.

In the embodiment of FIGS. 5 and 6, the particle fence 550 preferably has an extent measured along the upstream direction 512 that is at least 25 microns and no more than 8% of the total slider length measured along the upstream direction 512. These dimensional limits may be critical in certain embodiments, for example to avoid undesirable fabrication process consequences (e.g. due to tolerance stack-up), and/or to allow sufficient air flow having a lateral component immediately downstream of the particle fence 550, to adequately pressurize the air bearing surface 510.

In the embodiment of FIGS. 5 and 6, the air bearing surface 510 optionally includes two leading outboard dots 562, 564 in the primary plane. Each leading outboard dot 562, 564 preferably defines a dot radius in the range 10 microns to 45 microns. Each leading outboard dot 562, 564 is adjacent the leading face, adjacent a corner of the air bearing surface 510, and laterally adjacent the particle fence 550. During operation, the leading outboard dots 562, 564 may serve to prevent damage to the head disk interface under certain conditions that would otherwise lead to contact between a corner of the slider 504 and an adjacent disk surface.

Also in the embodiment of FIGS. 5 and 6, dot step surfaces 566 and 568 are disposed immediately upstream of each leading outboard dot 562 and 564, respectively. The dot step surfaces 566 and 568 are preferably recessed from the primary plane by 100 nm to 250 nm. One would normally not expect the air bearing surface 510 to include any dot step surfaces 566, 568, because the leading outboard dots 562, 564 are not relied upon for the generation of positive pressure in the air bearing. However, it has been found that in embodiments where the leading outboard dots 562, 564 are fabricated by deposition of diamond-like carbon on the air bearing surface 510, subsequent etching of the dot step surfaces 566, 568 may advantageously eliminate undesirable raised edges that might otherwise remain on the leading outboard dots 562, 564 (from preceding fabrication steps). Moreover, the dot step surfaces 566, 568 may also assist the particle fence 550 in blocking relatively large particles from entering the air bearing, while allowing more air flow through to pressurize the air bearing than would particle fence 550 if it were to extend to the leading outboard dots 562, 564 with a surface in the primary plane.

Figure 7:
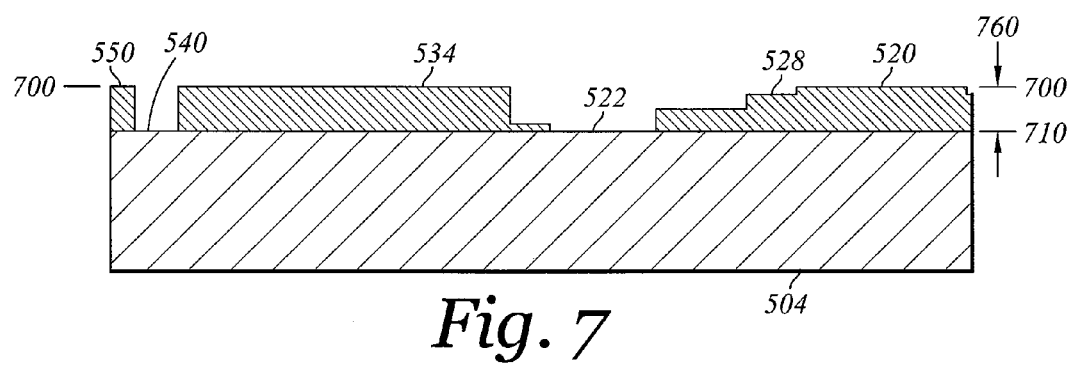
FIG. 7 is cross-sectional view of the head shown in FIG. 6, taken along the plane of cross-section designated as 7-7 in FIG. 6. For clarity, the step heights are not to scale but rather are exaggerated so as to be easily discernible.
Figure 8:
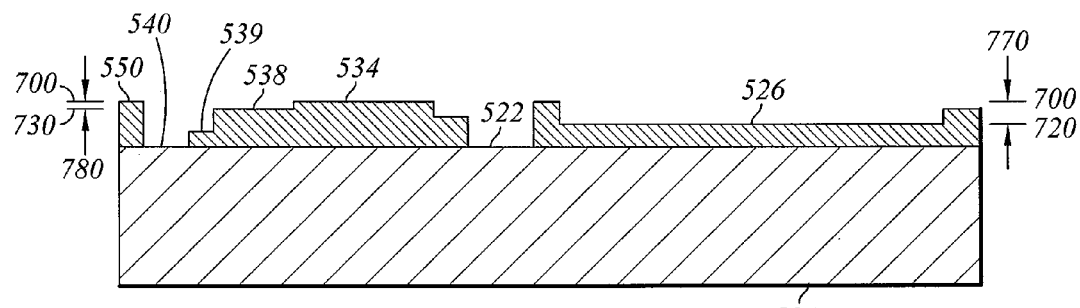
FIG. 8 is cross-sectional view of the head shown in FIG. 6, taken along the plane of cross-section designated as 8-8 in FIG. 6. For clarity, the step heights are not to scale but rather are exaggerated so as to be easily discernible.

FIGS. 7 and 8 are cross-sectional views of the head shown in FIG. 6, taken along the planes of cross-section designated as 7-7 and 8-8 in FIG. 6, respectively. For clarity, the step heights are not to scale but rather are exaggerated so as to be easily discernible. Now referring additionally to FIGS. 7 and 8, the trailing pad 520 includes a major surface that is not recessed and instead establishes an air bearing surface datum plane (hereinafter referred to as the primary plane) 700, from which the recession of other surfaces of the slider 504 that are parallel to the primary plane 700 may be measured.

In the embodiment of FIGS. 7 and 8, deep sub-ambient pressure cavities 522 each include a surface in a plane 710 that is recessed from the primary plane 700 by a deep cavity recession depth 760. The deep cavity recession depth is preferably but not necessarily in the range 3 microns to 4 microns. Shallow sub-ambient pressure cavities 524 and 526 each include a surface in an intermediate plane 720 that lies between the primary plane 700 and the plane 710, and that is recessed from the primary plane 700 by a shallow cavity recession depth 770. For example, the shallow cavity recession depth 770 is preferably in the range 0.5 microns to 2 microns.

In the embodiment of FIGS. 7 and 8, the leading pressurizing steps 536, 538 each include a surface in a plane 730 that lies between the primary plane 700 and the intermediate plane 720. The plane 730 is recessed from the primary plane 700 by a pressurizing step recession depth 780. The pressurizing step recession depth 780 is preferably in the range 100 to 250 nm. Note that, as shown in FIG. 6, secondary leading steps 539 may optionally be disposed immediately upstream of the leading pressurizing steps 536, 538. In such embodiments, secondary leading steps 539 are preferably recessed from the primary plane by at least 100 nm more than leading pressurizing steps 536, 538, but less than the recession of the moat 540.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

What is claimed is:

1. A head comprising:
    a slider having a leading face, a trailing face opposite the leading face, and an air bearing surface normal to the trailing face, the air bearing surface defining an upstream direction pointing from the trailing face to the leading face and defining a lateral axis that is orthogonal to the upstream direction, the slider having a width measured along the lateral axis; and
    a read transducer adjacent the trailing face;
    wherein the air bearing surface includes:
        a trailing pad including a major surface adjacent the read transducer, the major surface lying in a primary plane;
        a sub-ambient pressure cavity disposed upstream of the trailing pad, the sub-ambient pressure cavity being recessed from the primary plane by at least 500 nm;
        at least one leading pad in the primary plane and disposed upstream of the sub-ambient pressure cavity;
        a first step surface immediately upstream of the at least one leading pad, the first step surface being recessed from the primary plane by a first step depth in the range 100 nm to 250 nm;
        a moat disposed upstream of the at least one leading pad, the moat recessed from the primary plane by at least 500 nm, the moat continuously spanning the entire width of the slider;
        a particle fence in the primary plane and disposed immediately upstream of the moat, the particle fence disposed adjacent the leading face, the particle fence continuously laterally spanning at least 70% of the width of the slider, and
        a second step surface immediately upstream of the first step surface, the second step surface being recessed from the primary plane by a second step depth that is at least 100 nm greater than the first step depth, but less than the recession of the moat.

2. The head of claim 1 wherein the at least one leading pad spans at least 60% of the width of the slider.

3. The head of claim 2 wherein the at least one leading pad is shaped like a letter W that is oriented so that the center peak of the W points in the upstream direction.

4. The head of claim 1 wherein the air bearing surface includes two leading pads that together span at least 60% of the width of the slider.

5. The head of claim 4 wherein the two leading pads are shaped and adjoined together form a shape like a letter W that is oriented so that the center peak of the W points in the upstream direction.

6. The head of claim 1 wherein the slider has a length measured along the upstream direction, and wherein the particle fence has an extent measured along the upstream direction that is at least 25 microns but no more than 8% of the slider length.

7. The head of claim 1 wherein the slider has a length measured along the upstream direction, and wherein the moat has an extent measured along the upstream direction that is at least 25 microns but no more than 8% of the slider length.

8. The head of claim 1 wherein the read transducer is part of a merged transducer that also includes a write transducer.

9. The head of claim 1 further comprising two leading outboard dots in the primary plane, each leading outboard dot defining a dot radius in the range 10 microns to 45 microns, each leading outboard dot being adjacent the leading face and adjacent a corner of the air bearing surface, and being laterally adjacent the particle fence.

10. The head of claim 9 further including a dot step surface immediately upstream of each leading outboard dot, the dot step surface being recessed from the primary plane by a first step depth in the range 100 nm to 250 nm.

* * * * *